US005783010A

United States Patent [19]

Fisher et al.

[11] Patent Number: 5,783,010
[45] Date of Patent: Jul. 21, 1998

[54] HIGH SPEED SPLICE

[75] Inventors: Scott D. Fisher, Vadnais Heights; Jeffrey M. Storeby, South Saint Paul, both of Minn.

[73] Assignee: HMS Label Specialties, Inc., Minneapolis, Minn.

[21] Appl. No.: 843,067

[22] Filed: Apr. 11, 1997

[51] Int. Cl.$^6$ .................................. B31F 5/06; B32B 3/10
[52] U.S. Cl. ........................ 156/159; 156/266; 156/304.3; 156/304.5; 156/505; 156/514; 428/61
[58] Field of Search .......................... 156/159, 304.3, 156/502, 266, 157, 304.5, 505, 514, 263, 265; 428/61

[56] References Cited

U.S. PATENT DOCUMENTS

| T889,025 | 8/1971 | Ulmschneider et al. | 156/159 |
|---|---|---|---|
| 2,318,287 | 10/1943 | Brolin | 156/159 X |
| 2,676,704 | 4/1954 | Marks | 156/304.3 X |
| 3,758,355 | 9/1973 | Witherow | 156/304.3 X |
| 3,853,654 | 12/1974 | Patton | 156/502 X |
| 3,873,401 | 3/1975 | Gustafson | 156/159 X |
| 4,417,940 | 11/1983 | Koster | 156/502 X |
| 5,039,374 | 8/1991 | Winter | 156/504 |
| 5,279,696 | 1/1994 | Zangenfeind et al. | 156/502 X |

*Primary Examiner*—Mark A. Osele
*Attorney, Agent, or Firm*—Janal M. Kalis

[57] ABSTRACT

The splice of the present invention includes a web having a first free end and a second free end wherein the first and second ends are positioned proximal to each other. The web encloses one or more holes adjacent to each end. The web includes a top side and an opposing underside. The splice also includes an underside patch that is adhered to the web so that the underside patch covers the hole or holes and covers each of the free ends of the web. The underside patch is adhered to the web by a reversibly releasable layer. The upper side patch is positioned substantially parallel to the underside patch. The upper side patch contacts the underside patch through one or more of the holes thereby strengthening the splice.

5 Claims, 1 Drawing Sheet

HIGH SPEED SPLICE

BACKGROUND OF THE INVENTION

The present invention relates to a label web splice and to a method of making the label web splice.

The advent of high speed label application technology has created a new set of problems related to label substrates and to feed stock technology because this label-substrate technology has not kept pace with the technology of the high speed label equipment and the processes for applying labels at high speed.

One problem in particular relates to label web design. Label web designs have undergone very little change when compared to the dramatic changes in high speed label application technology. For instance, label web length has not kept pace with the high speed length requirements of label application. These requirements include an application of labels at a rate that ranges from 600 labels per minutes to 1,600 labels per minute. As a consequence, a high speed labeling process rapidly utilizes a web, such as a fan-folded web. Label application manufacturers then must either stop the high speed label process, which tends to defeat the purpose of labeling at high speed, or the label applicator must splice fan-folded webs together in order to make a much longer continuous label web.

Splicing has presented its own problems for high speed labeling. Typically, the splice tends to be thicker than the web. As a consequence, when the spliced area contacts the label application equipment, the increased thickness is incompatible with precise spatial tolerances of machine equipment and the labeling process is stopped. Prior to stopping the labeling process, it is not at all unusual for a significant portion of the web to be destroyed. This destruction causes significant waste of labels and product as well as substantial downtime.

One type of splice that has historically been used is a "butt splice." With the butt splice, two ends of a web are attached by a single adhesive strip. If alignment is imprecise so as to expose the adhesive strip to a label that overlays the web at the splice, the label tends to stick to the web at the splice. Consequently, the label is not successfully transferred and the high speed label transfer operation comes to a halt. Furthermore, the butt splice has generally been unacceptable for use in high speed labeling applications because it lacks the necessary strength.

A second type of splice with historical use has been an angle splice. With the angle splice, the web is cut width-wise at an angle of about 45° to make two ends. The ends are attached with an adhesive strip as described for the butt splice. The adhesive strip attachment problem described for the butt splice is also a problem for the angle splice. One other problem with the angle splice has been that the web tends to delaminate at the angle. The delamination destroys alignment within the high speed labeling machinery and the process is brought to a standstill. Angle splices have, unfortunately, been as unsuccessful as the butt splice described, especially in a high speed label transfer process.

A third type of splice with historical use, an overlap splice, is made by a method that includes a step of splicing two newly created ends of a coupon web in the middle of a web segment. One disadvantage of the overlap splice is that it cannot connect trailing ends of web segments. Instead, splices must occur in the middle of a web segment. The overlap splice is made by overlaying one end of a web segment over a web coupon of a second segment. Adherence of the first end is along a narrow strip. Thus, one problem with the overlap splice is that the peel tip of a corresponding label can "catch" the trailing edge of the overlap splice. This "catching" causes misalignment within the labeling machine and causes the entire labeling process to stop.

One other disadvantage of the overlap splice is that all segments of the splice must be properly oriented. If the splice is improperly oriented, the labels along one length of a web segment are applied to a container backwards. It is also important that no label be positioned on the back of the overlapped web.

One enormous disadvantage of each of the butt splice, angle splice and overlap splice has been unacceptably high incidents of failure. It has discouragingly been found that 30%–40% of the splices are of a nature that they cause the entire labeling process to "go down".

U.S. Pat. No. 5,039,374, issuing Aug. 13, 1991, describes, in FIGS. 7A through 7D, a splice whereby two free ends of a label or coupon are adhered to each other. This type of splice cuts through the label or coupon as well as the underlying web. This splice requires an overlap of the coupon or label, thereby increasing web thickness at the splice.

SUMMARY OF THE INVENTION

The splice of the present invention includes a web having a first free end and a second free end wherein the first and second ends are positioned proximal to each other. The web encloses one or more holes adjacent to each end. The web includes a top side and an opposing underside. The splice also includes an underside patch that is adhered to the web so that the underside patch covers the hole or holes and covers each of the free ends of the web. The underside patch is adhered to the web by an adhering layer. The splice also includes an upperside patch adhered to the web by an adhering layer. The upperside patch is positioned substantially parallel to the underside patch. The upperside patch contacts the underside patch through one or more of the holes thereby strengthening the splice.

The present invention also includes a method for splicing a web. The method includes providing two or more web segments, each having two free ends. The ends are positioned adjacent each other but do not overlap. One or more holes are punched in the web segments proximal to each of the ends of the web segments. A first patch is applied to the underside of the web segments to capture the two ends. The first patch includes an adhering layer and a polymeric layer wherein the adhering layer is adhered to the polymeric layer. The adhering layer contacts the web segments thereby joining free ends of the web and covering the hole or holes. A second patch is then applied. The second patch, also having a polymeric layer and an adhering layer, is applied parallel to the first patch so that the second patch also adheres to the ends of the web segments and covers the holes so that the first patch contacts the second patch.

The present invention also includes a method for a rapid label transfer from a web of up to infinite length comprising providing a first web segment having a first end and a second end and providing a second web segment having a third end and a fourth end wherein the second end and third end are positioned proximal to each other, and wherein the web segment enclose one or more holes adjacent to each of the second end and third end and further wherein the web has a top side and an underside. The method also includes providing a splice that includes an underside patch adhered to the second end and third end of the web segment so that the underside patch covers the hole or holes and covers each of the second and third ends of the web segment, the underside patch adhered to the underside of the web by an adhesive layer. The splice further includes an upperside patch adhered to the web segment by an adhering layer, the upperside patch positioned substantially parallel to the underside patch. The upperside patch contacts the underside patch through one or more of the holes.

DETAILED DESCRIPTION OF PREFERRED EMBODIMENTS

Figure 1:
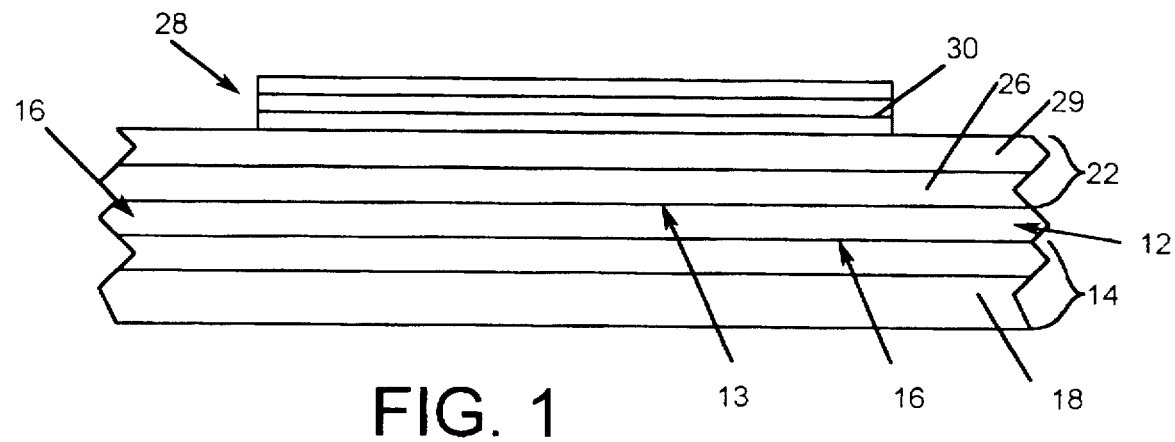
FIG. 1 illustrates one cross-sectional view of the splice of the present invention.

The splice of the present invention illustrated generally at 10 in FIG. 1 includes a web 12 that extends substantially continuously on either side of a break 13, an underside patch 14 contacting and adhered to an underside 16 of the web wherein the underside patch 14 comprises an outer polymeric layer 18 and an adhesive layer 20 at which the patch 14 adheres to the web 12. A second upper side patch component 22 overlays the web 12 and is substantially parallel to the underside patch component 14. The upper side patch component 22 also includes a polymeric substrate 24 to which is adhered an adhesive layer 26. The adhesive layer 26 contacts the web 12. A coupon or label 28 adheres to each of the web 12 and the upperside patch component 22 by a silica release layer 30.

Unlike splices heretofore used, the splice of the present invention 10 does not require cumbersome and precise alignment of two ends of two web segments. Further, the splice of the present invention does not introduce an undesirable thickness to the web. Typically for the prior art overlapped splice, two label or coupon sections are overlapped to form an overlapped area. However, the overlapped area introduces a thickness to the web and coupon or label which is incompatible with labeling machinery subsequently encountered by the web. As a consequence, the web breaks in the machinery and the result is a significant waste of material caused by destruction of labels and coupons. This problem is especially aggravated in high speed labeling processes where machinery operates with exceedingly tight thickness tolerances. As described, the change in thickness in a web at a splice as well as misalignment and label "catching" and repair have been a source of substantial downtime and product and label material waste. As discussed, unlike the splice of the present invention, prior art splices also lack the strength necessary to withstand stresses and forces of high speed application.

The splice of the present invention 10 eliminates this problem because the splice of the present invention 10 does not cut through a coupon or label. Rather, the splice 10 is directed only to the underlying web 12. Furthermore, the splice 10 includes a pair of thin patch components 14 and 22 that each include a layer of polymeric material having strength and a fairly low coefficient of friction. In one embodiment, each of the first and second patch components 14 and 22 are made of either a polypropylene or polyethylene material and are adhered to the web 12 by adhesive layers 26 and 30, respectively. Any conventional adhesive material or adhering material may be suitable for use in the splice 10 of the present invention.

Figure 2:
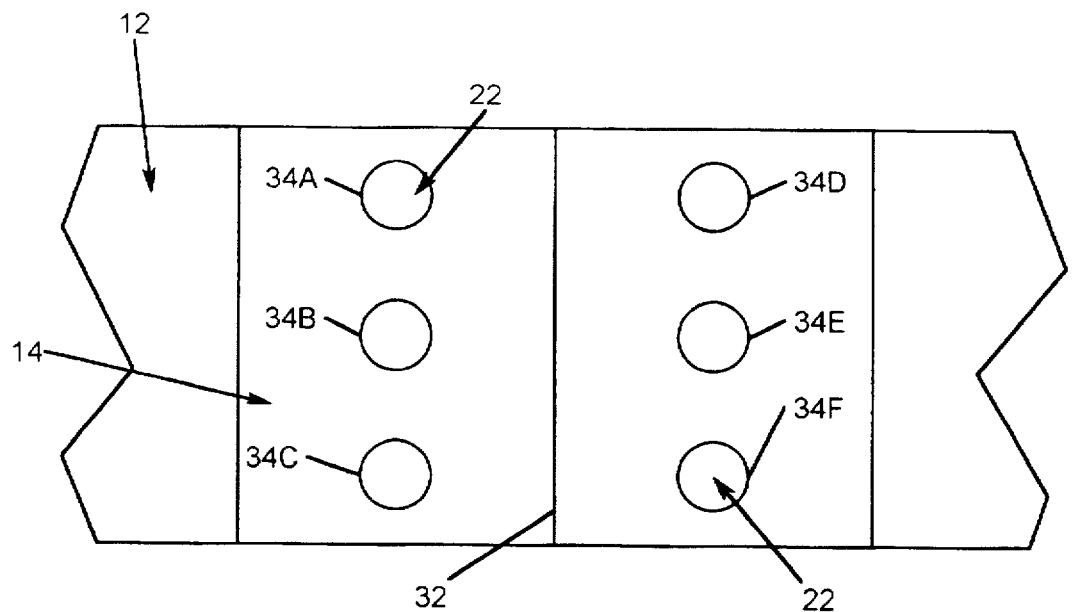
FIG. 2 illustrates in a bottom elevational view, one embodiment of the high speed splice of the present invention.

One underside view of the web 12 with the splice patch components 22 and 14 is shown generally in FIG. 2. Two free ends shown at area 32 of the web 12 are covered by each of the splice patch components 14 and 22.

The web 12 encloses an array of holes 34 A, B, C, D, E, and F. The holes 34 A-F permit the underside patch component 14 to adhere to the upperside patch component 22. The holes 34 A-F then ultimately, aiding in strengthening the splice 10. While six holes are shown, it is understood that more holes or fewer holes may be acceptable for use in the present invention.

In one embodiment, the holes have a diameter of about ¼ inch. The patch has a width of about ½ inches. A distance of about ⅛ of an inch separates the hole from an edge of the patch. It has been found that this arrangement strengthens the splice without causing any additional problems of misalignment or delamination. It has surprisingly been found that the splice of the present invention, by strengthening the web at the splice, substantially eliminates breaks in the web and downtime due to breaks. As discussed, prior to the splice of the present invention, manufacturers commonly encountered splice breaks up to 30%–40% of all splices installed. Further, the splice of the present invention does not require perfect alignment of ends of the web in order to prevent a label from sticking to the web.

The splice of the present invention 10 is usable on virtually any symmetry of web 12. The splice 10 may be used on a web carrying only a single row of coupons or labels. The splice may also be used on a web containing two or more rows of labels or coupons. The splice may additionally be used on a web conveying very thick labels, such as coupon labels. Because the splice of the present invention does not rely upon a single adhesive strip, unlike the butt splice and the angle splice, the splice does not complicate the difficult operation of aligning two label parts or of applying a thick coupon label to an article.

The splice 10 of the present invention can be applied to the web 12 in a manual operation. It is also contemplated that application of the splice 10 to a web may be performed mechanically.

Although preferred embodiments of the invention have been described in considerable detail, such description is intended to be illustrative rather than limiting, for the invention may be variously embodied and is to be limited only by interpretation of the claims which follow.

What is claimed is:

1. A splice comprising:
   a web having a first end and a second end wherein the first and second ends are positioned proximal to each other, wherein the web encloses one or more holes adjacent to each end and further wherein the web has a top side and an underside;
   an underside patch adhered to the web so that the underside patch covers the hole or holes and covers each of the ends of the web, the underside patch adhered to the underside of the web by an adhesive layer;
   an upper side patch adhered to the web by an adhesive layer, the upper side patch positioned substantially parallel to the underside patch, the upper side patch contacting the underside patch through one or more of the holes;
   a coupon or label attached by a reversibly releasable adhesive to be opposite the underside patch so that the coupon or label adheres to the upperside patch of the splice.

2. The splice of claim 1 wherein each of the upperside patch and the underside patch comprises a polymeric layer to which the adhesive layer is adhered.

3. The splice of claim 2 wherein the polymeric layer is made of a material selected from the group that includes polypropylene and polyethylene.

4. The splice of claim 1 wherein the adhesive material is a silica based material.

5. A method for lengthening a web for high speed label transfer, comprising:

provvding n web having an n end and an n+1 end opposing the n end wherein labels are attached to the n web;

providing an n+1 web having an n+2 end and an n+3 end opposing the n+2 end wherein labels are attached to the n+1 web;

making holes in the n web and the n+1 web at ends n, n+1, n+2, and n+3;

adhering an underside patch to the n web and the n+1 web so that the underside patch covers the hole or holes at the ends n+1 and n+2 and that covers each of the ends n+1 and n+2, the underside patch adhered to the underside of the web by an adhesive layer;

adhering an upper side patch to the n web and n+1 web by an adhesive layer, the upper side patch positioned substantially parallel to the underside patch, the upper side patch contacting the underside patch through one or more of the holes;

wherein labels are adhered to the web at the patches by a releasable adhesive.

* * * * *